April 11, 1939.  A. E. COOPER  2,153,549
COMBINATION BAIT AND TACKLE BOX
Filed July 16, 1937   2 Sheets-Sheet 1

INVENTOR
A. E. Cooper
BY
ATTORNEY

April 11, 1939.   A. E. COOPER   2,153,549
COMBINATION BAIT AND TACKLE BOX
Filed July 16, 1937   2 Sheets-Sheet 2

INVENTOR
A. E. Cooper
BY
ATTORNEY

Patented Apr. 11, 1939

2,153,549

UNITED STATES PATENT OFFICE 2,153,549

COMBINATION BAIT AND TACKLE BOX

Albert E. Cooper, Tracy, Calif.

Application July 16, 1937, Serial No. 153,967

4 Claims. (Cl. 43—31)

This invention relates generally to equipment for sportsmen and in particular is directed to a combination bait and tackle box for fishermen; the principal object of my invention being to provide in combination a unitary bait and tackle box. The device is so arranged that all the necessary tackle is carried in a convenient and readily accessible position while the bait carrying portion of the box is arranged for use either with live bait or bait of other types.

Another object of my invention is to provide a tackle box including a novel form of snelled hook retaining compartment, such compartment being so arranged that the snelled hooks are maintained in full length position and so that they cannot become entangled with other tackle in the box.

A further object of my invention is to provide a combination bait and tackle box which when disposed in closed position also serves as a sturdy and comfortable seat for a fisherman.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
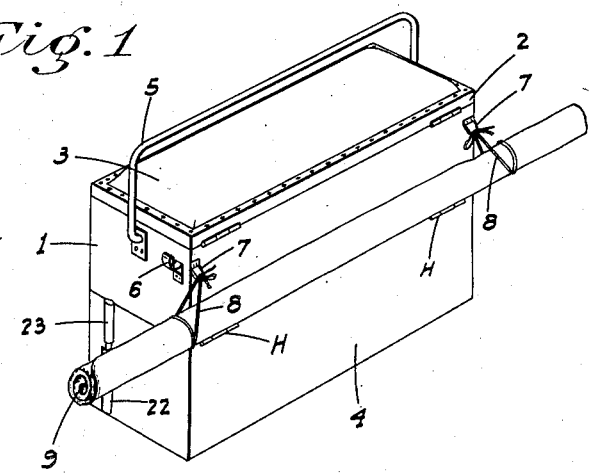
Figure 1 is a perspective view of my combination bait and tackle box for fishermen.
Figure 2:
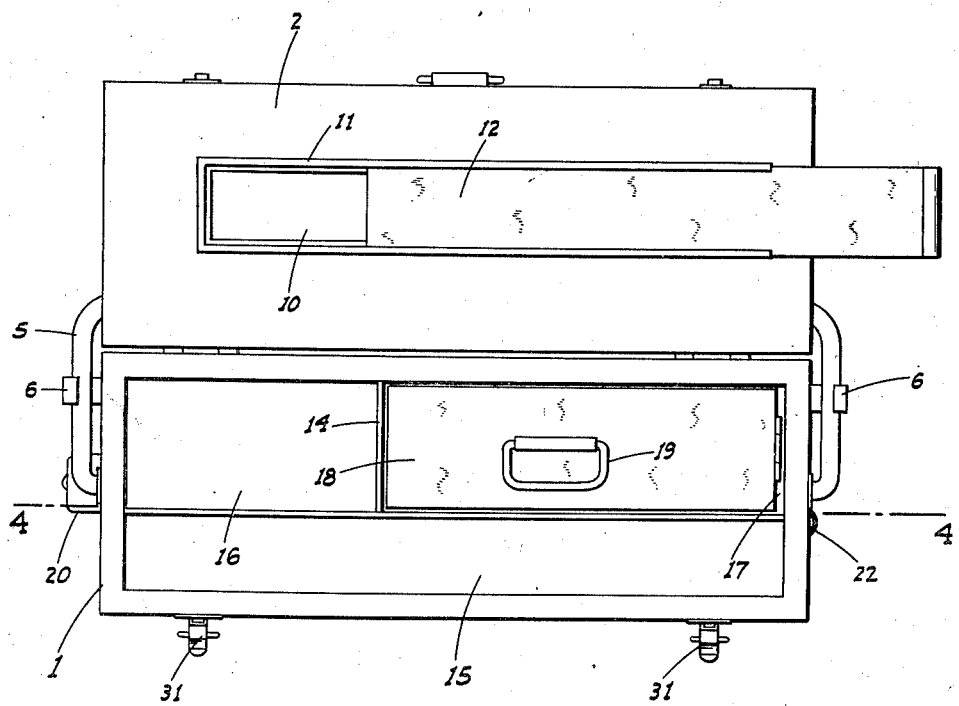
Figure 2 is a top view of the device with the handle in folded position and with the lid of the upper box section thrown back.
Figure 3:
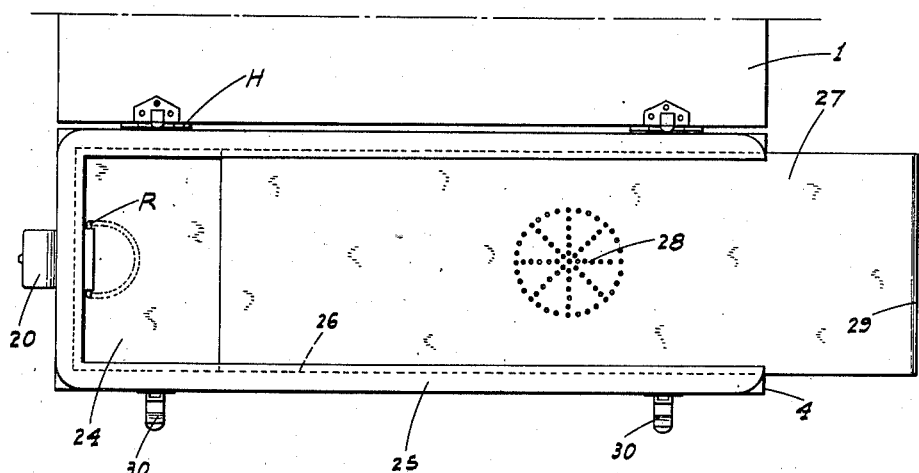
Figure 3 is a plan view of the device with the upper box section thrown back.
Figure 4:
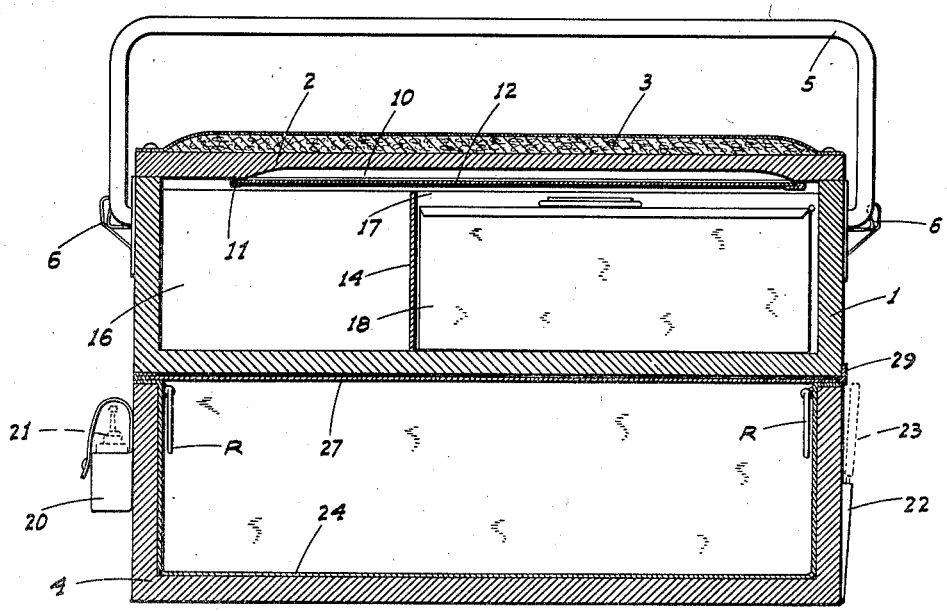
Figure 4 is a sectional elevation on line 4—4 of Fig. 2.

Referring now more particularly to the characters of reference on the drawings, my improved combination bait and tackle box comprises an upper box section 1 which is rectangular in configuration and relatively long. This upper box section is provided with a lid 2 which is padded on top as at 3 in order to form a seat. The upper box section 1 is disposed on top of and hinged as at H along one side at the bottom edge to the upper edge of the corresponding side of the lower box section 4; such upper box section forming, when closed, the closure for the lower box section. A handle or bail 5 is pivoted to the upper box section at each end adjacent the upper edge and is arranged for downward folding movement clear of the lid 2 as shown in Fig. 2. Catches 6 on the ends of the upper box section limit such downward folding movement of the handle 5.

The upper box section is provided with metallic loops 7 secured to the same side thereof as hinges H, such loops being adapted to receive the tie cords 8 of a rolled rod holding case 9. In this manner the rod and its case may be securely attached to the device for carrying purposes.

The inner face of the lid 2 is formed with a longitudinally extending recess 10. Metallic guides 11 are secured to the top along the side edges of this recess and are arranged to receive a closure plate 12 in slidable relation therein. The longitudinal recess is provided for the purpose of holding snelled fishhooks. The fishhooks may be laid in the recess in full length or extended position preventing unnecessary bending or damaging of the snells which are quite fragile when dry. Also the hooks are separated from the remainder of the tackle in the box and are thus kept in excellent condition. The closure plate of course slides over the recess 10 and prevents accidental escape of the hooks.

The upper box section is divided by a longitudinal partition 13 and a transverse partition 14 into a full length compartment 15 for a folding gaff, a reel receiving compartment 16 and another compartment 17 in which is removably disposed a lidded tackle box 18 provided with suitable handle 19. This tackle box 18 is intended for the reception of tackle such as sinkers, plugs, spinners and the like. The lower box section 4 is provided at one end and on the outside with a receiving pocket 20 for an oil can 21 while at the other end on the outside there is provided a sheath 22 for a knife 23.

A bait receiving can 24 snugly but removably engages within the lower box section 4, such can being provided along its side edges with flange portions 25 bent to form grooves 26 for the reception of a slidable closure plate 27 perforated as at 28. The outer end of the closure plate 27 is provided with an upstanding finger engaging flange 29 to facilitate placement and removal of such closure plate. The flanges 25 are relatively thin and so arranged that the upper box section may be closed over the lower box section without interference even when the closure plate 27 is in place. The bait can at the ends and interiorly thereof is provided with rings R which, when the closure plate 27 is removed, may be swung upward to facilitate removal of such can from the lower box section.

During transportation of the device the upper and lower box sections are normally held against opening movement by snap fasteners 30, and the lid 2 is similarly held by snap fasteners 31.

When the bait can 24 is used for live bait such as minnows, it is filled with water, the minnows placed therein, and the closure plate then slid into place in grooves 26. Even though the upper box section is disposed immediately above and close to the bait can during transportation, sufficient air will gain access between the upper and lower box sections and through perforations 28 to maintain the water in the bait can aerated.

The combination bait and tackle box which I have provided and as hereinbefore described provides a device which affords a fisherman ready access to any and all of his equipment as well as to the bait which he is using. Also, as will be obvious, the device when the upper box section is folded onto the lower box section provides a comfortable seat of proper height for fishing from a river bank or the like.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A tackle box for fishermen comprising an open topped box, an unbroken hinged closure member for the box, a metallic bait can removably disposed in the box in close engagement, a flat closure plate for the can, and means removably mounting the plate on the can and in position below the plane of the inner surface of said closure member when closed whereby to permit unrestricted closure of said member.

2. In a tackle box for fishermen, a pair of box sections, said sections being disposed in superimposed relation, the upper section having a flat bottom and the lower section being initially open topped whereby the bottom of the upper section forms a closure for the lower section, hinge means between the sections along adjacent edges on one side, a bait can removably disposed in the lower section, said can being symmetrical with the interior of said lower section and closely engaged therein, a closure plate for the can, and means removably mounting the plate on the can, said means being arranged so that, when the plate is disposed in place, movement of the upper section to and from the lower section closing position is unrestricted.

3. In combination, a fishermen's tackle box, a hinged lid for the box, a bail pivoted at its ends on the ends of the box and arranged for downward folding movement to one side of the box and clear of the lid, a catch element for the bail mounted on the box in position to limit downward movement thereof, and means on said one side of the box below the plane of said catch element and arranged to removably secure a fishing rod against said one side of the box in substantially horizontal position.

4. A tackle box for fishermen comprising an open topped box, a hinged closure member for the box, a metallic bait can removably disposed in the box in close engagement, a closure plate for the can and means removably mounting the plate on the can to permit unrestricted closing movement of said closure member; the plate having parallel side edges and said means comprising plate receiving grooves formed in the can along the upper side edges.

ALBERT E. COOPER.